July 12, 1932. L. W. JOYCE ET AL 1,867,077
BUCKLE ASSEMBLING MACHINE FOR WEBBING
Filed April 9, 1931 6 Sheets-Sheet 1

Inventor
L. W. Joyce
J. H. Sanderson
By Mason Fenwick Lawrence
Attorneys

Inventor
L. W. Joyce
J. H. Sanderson
By Mason Fenwick Lawrence
Attorneys

July 12, 1932.  L. W. JOYCE ET AL  1,867,077
BUCKLE ASSEMBLING MACHINE FOR WEBBING
Filed April 9, 1931    6 Sheets-Sheet 4
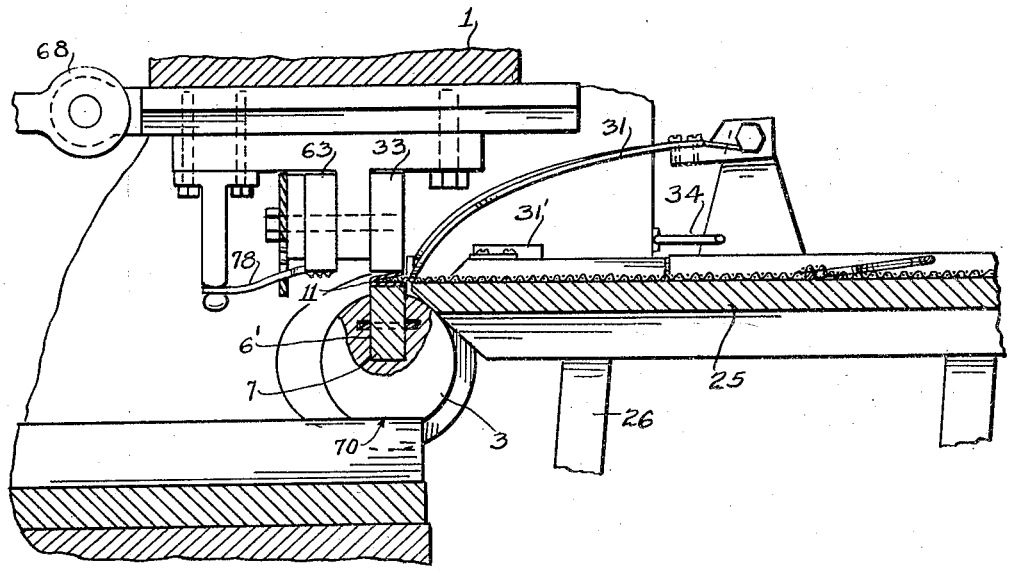
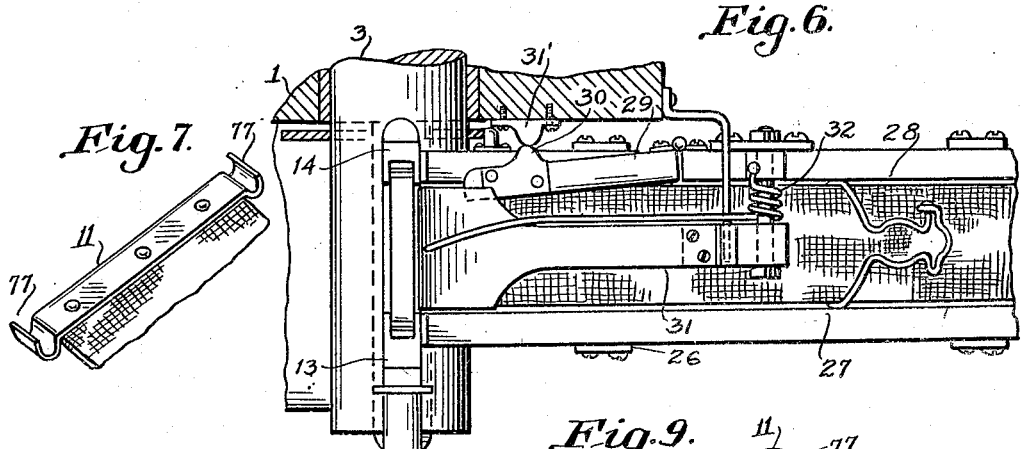
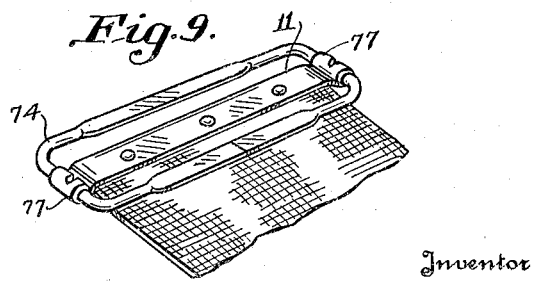
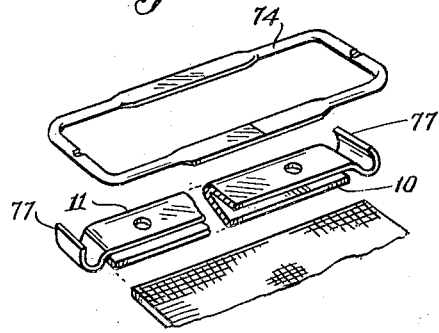
Inventor
L. W. Joyce
J. H. Sanderson
By Mason, Fenwick & Lawrence
Attorneys July 12, 1932. L. W. JOYCE ET AL 1,867,077
BUCKLE ASSEMBLING MACHINE FOR WEBBING
Filed April 9, 1931 6 Sheets-Sheet 5
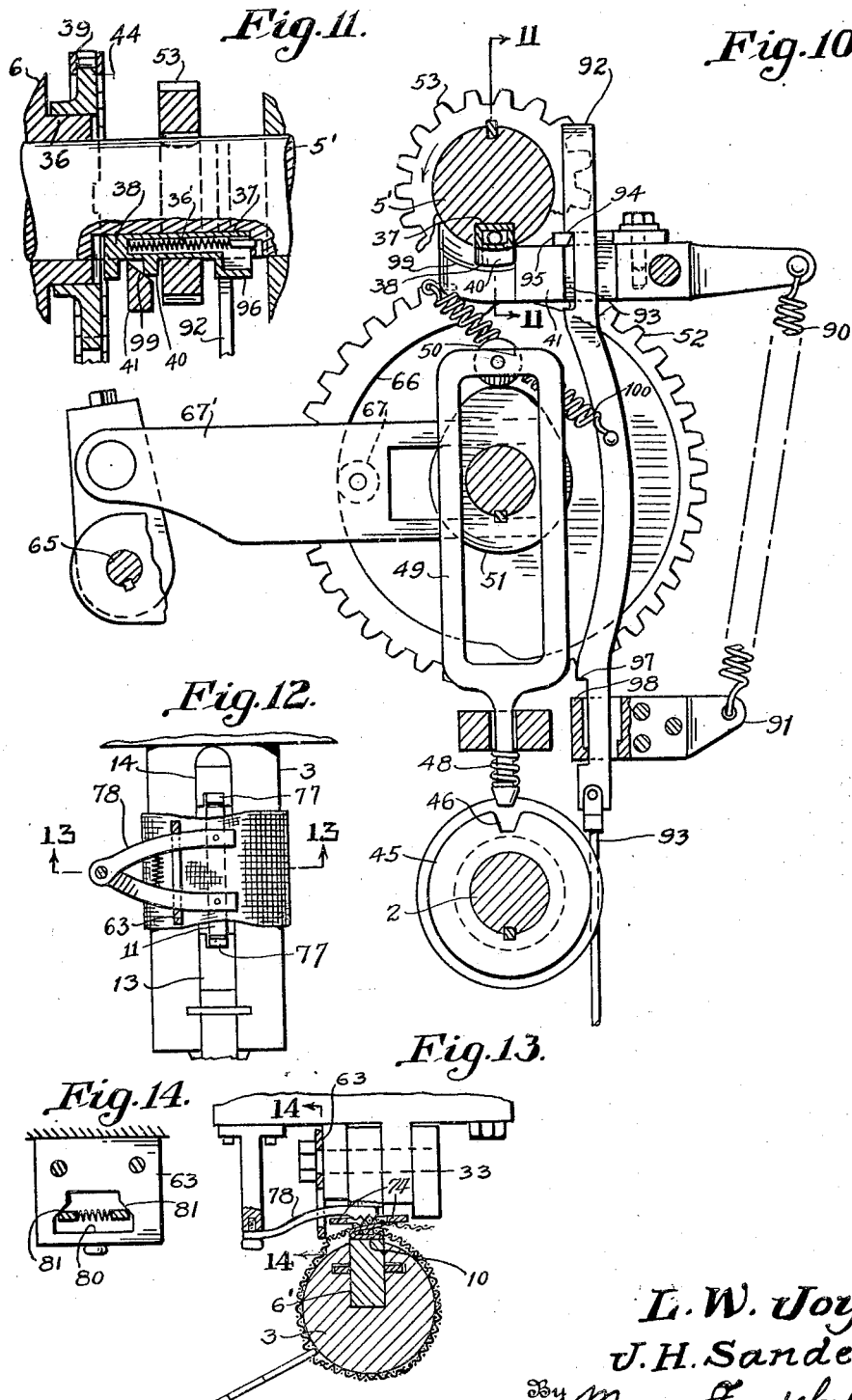
Inventor
L. W. Joyce
J. H. Sanderson
By Mason Fenwick Lawrence
Attorneys July 12, 1932.  L. W. JOYCE ET AL  1,867,077
BUCKLE ASSEMBLING MACHINE FOR WEBBING
Filed April 9, 1931  6 Sheets-Sheet 6
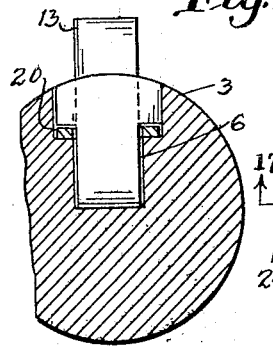
Fig.16.
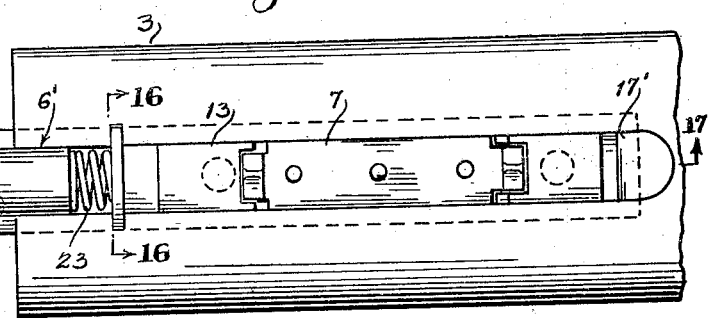
Fig.15.
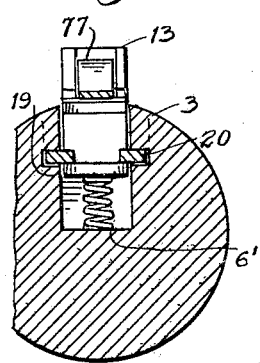
Fig.18.
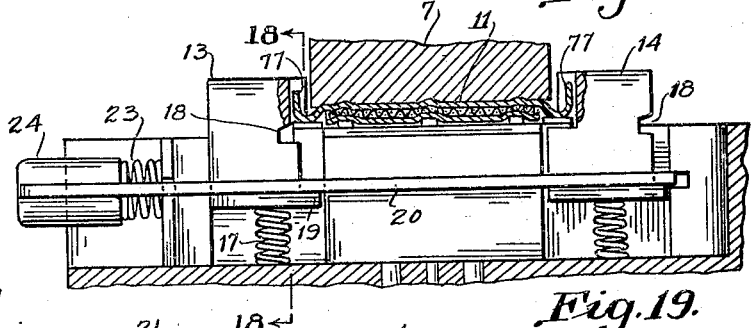
Fig.17.
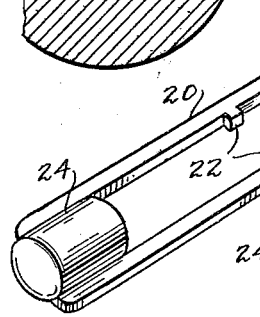
Fig.22.
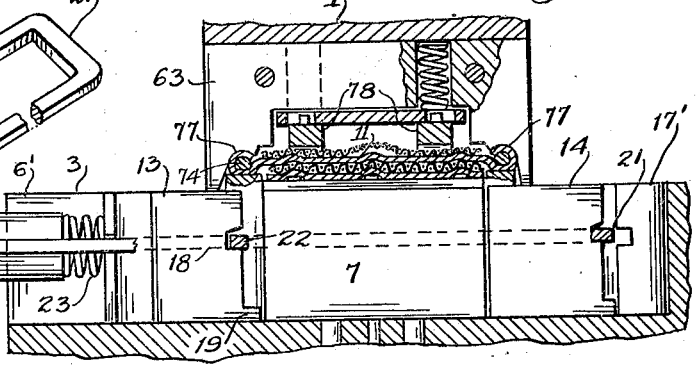
Fig.19.
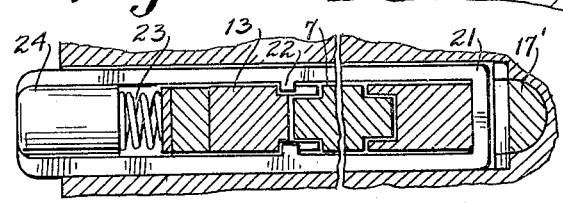
Fig.20.
Fig.21.
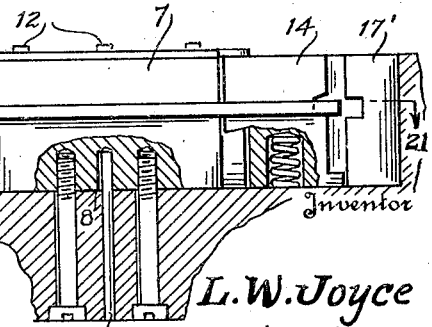
Inventor
L. W. Joyce
J. H. Sanderson
By Mason Fenwick Lawrence
Attorneys Patented July 12, 1932

1,867,077

UNITED STATES PATENT OFFICE

LYNDON W. JOYCE, OF GREENSBORO, NORTH CAROLINA, AND JOSEPH H. SANDERSON, OF BABYLON, NEW YORK, ASSIGNORS TO JOYCE-VENNING MANUFACTURING CO., INC., OF GREENSBORO, NORTH CAROLINA, A CORPORATION OF DELAWARE

BUCKLE ASSEMBLING MACHINE FOR WEBBING

Application filed April 9, 1931. Serial No. 528,944.

This invention relates to a machine for assembling a suspender web and the component parts of the suspender slide, with the object of avoiding the present practice of assembling the suspender parts by threading the suspender web through the openings defined between the slide frame and the middle bar in a preformed slide.

The invention is described in the following specification and illustrated by drawings in which:

Figure 5 is a section taken along the line 5—5 of Figure 2;

Figure 6 is a plan view of the parts shown in Figure 5, certain portions being omitted;

Figure 7 is a perspective view showing the result of the first pressing operation;

Figure 8 is an exploded view showing the component portions of the slide, with the web in operative juxta-position;

Figure 9 is a similar view showing the parts brought together in finished assembly;

Figure 10 is a vertical section taken along the line 10—10 of Figure 3;

Figure 11 is a vertical section taken along the line 11—11 of Figure 10;

Figure 12 is a plan view of the crimping device which operates in conjunction with the second pressing operation;

Figure 13 is a section taken along the line 13—13 of Figure 12;

Figure 14 is a vertical section taken along the line 14—14 of Figure 13;

Figure 15 is a fragmentary plan view showing a portion of the horn with the release mechanism for the keeper members;

Figure 16 is a section taken along the line 16—16 of Figure 15;

Figure 17 is a section taken along the line 17—17 of Figure 15;

Figure 18 is a section taken along the line 18—18 of Figure 17;

Figure 19 is a view similar to that of Figure 17, but showing the keeper members depressed by the second die;

Figure 20 is a view similar to Figure 19, the second die being omitted;

Figure 21 is a section taken along the line 21—21 of Figure 20, the intermediate portion being broken away; and Figure 22 is a perspective view of the release latch for the keeper members.

The machine constituting the present invention is designed for carrying out the process which forms the subject matter of my pending application, Serial No. 486,475, filed October 4, 1930. Briefly stated, this process deals with the slide frame and the metal bar of the slide in unassembled condition and a piece of suspender webbing. The process consists in placing a button retaining loop or element upon the suspender webbing and then folding the webbing about the button retaining loop so as to arrange one layer of webbing above another, then placing the middle bar of the suspender slide beneath the two layers of webbing and the frame of the suspender slide above the two layers and in co-operative position with respect to the middle bar, and then applying pressure to the frame and middle bar while so positioned in order to integrate them into an assembled slide, with the two layers of the folded webbing in between them, the button retaining loop being thus confined within the loop formed by the folded web.

A more specific adaptation of the process consists in forming the middle bar with a trough and then, before folding the web so as to form superposed layers in the manner hereinbefore set forth, inserting the web in the end of said trough and applying pressure to the middle bar so as to flatten the sides of the trough clampably against the end of the web, then folding the web, applying the frame and resorting to a second pressing operation to integrate the two parts of the slide into a unitary whole. The machine of the present invention is capable of carrying out this process with the assistance of certain manually performed acts as will hereinafter appear.

Figure 1:
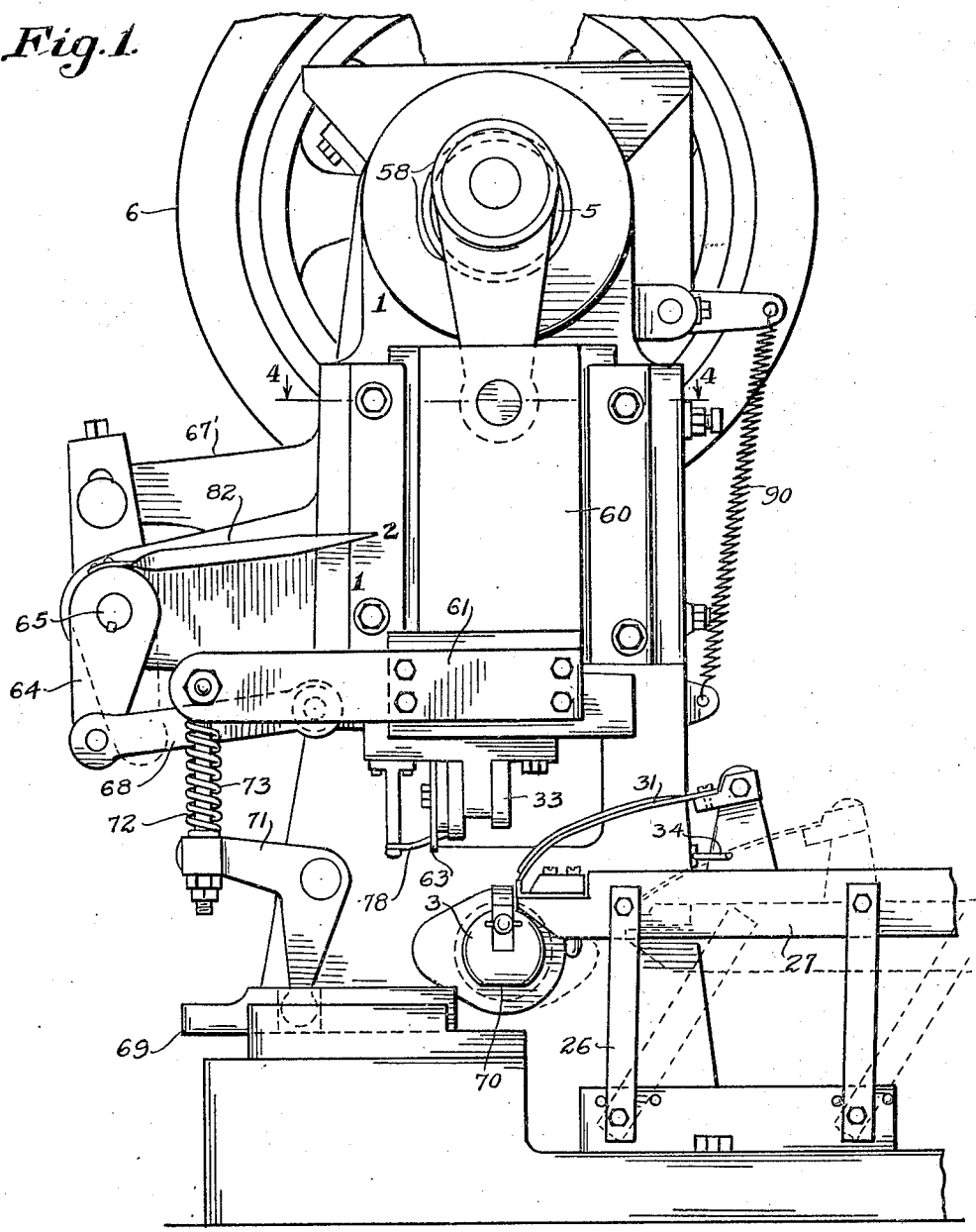
Figure 1 is a front elevation of the assembling machine.
Figure 2:
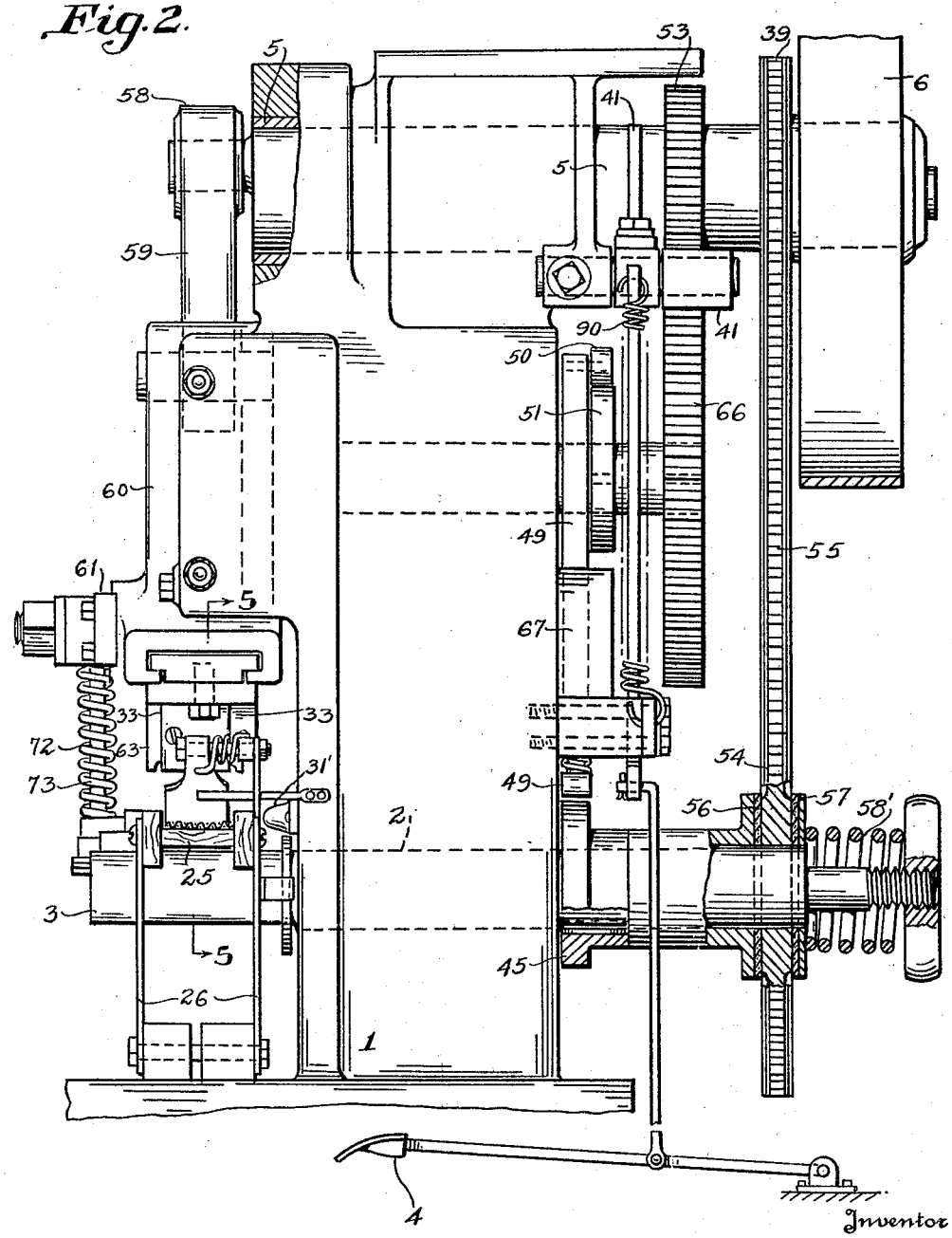
Figure 2 is a side elevation, certain parts being shown in section.
Figure 3:
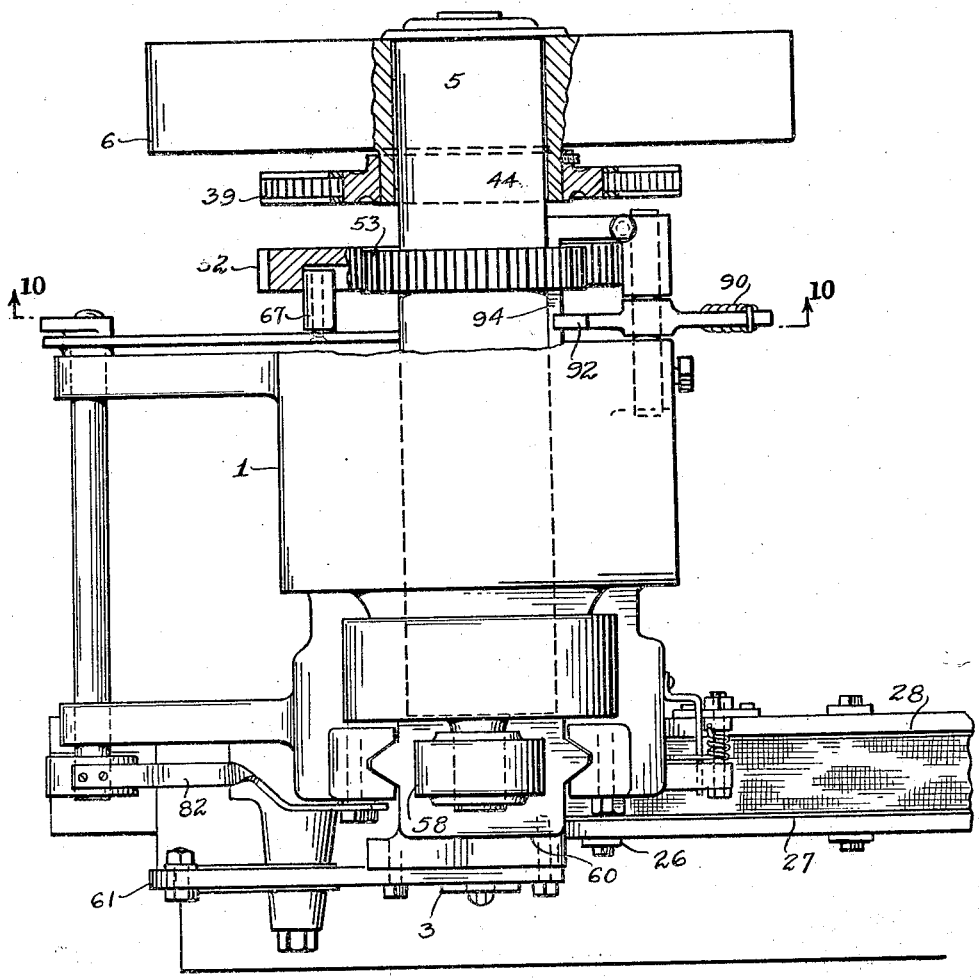
Figure 3 is a plan view partly in section.
Figure 4:
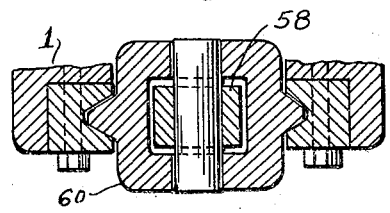
Figure 4 is a section taken along the line 4—4 of Figure 1.

Referring to the drawings and particularly to Figures 1, 2, 5 and 6, a frame 1 is provided in which is journalled a shaft 2 having a projecting portion or horn 3. When power is coupled to the machine as by pressing upon the foot treadle 4, the horn rotates through a single revolution and then automatically comes to a rest. The construction of the clutch 5 which couples the power wheel 6 to the machine is such as to release the power automatically after the crank shaft 5' has made one complete rotation, but as will be later explained, the movement of the crank shaft and the horn are not synchronous, since it is desirable to have the horn rotate at a considerably slower rate of speed than the crank shaft, in order to give time for certain manipulative operations in connection with the placing of the slide parts on the horn. It is clearly shown in Figures 1, 2 and 5 as well as other figures that the horn is provided with a longitudinal groove 6' in which rests a die 7, said die being readily insertible and removable. Said die through variations in tolerance may be narrower than said groove in some instances so that it may be advisable to center the die by having a bore 8 in its lower face adapted to receive a pin 9 carried by the horn 3 and preferably inserted through a diametrical bore extending through said horn to the opposite surface thereof from said die.

Said die has for its purpose the clamping of the sides of the trough 10 of the middle bar 11 shown in Figure 8 on to the end of the suspender web and for the purpose of making the clamping engagement positive. Said die is preferably provided with small projections 12 which upset the metal of the cross bar correspondingly, forcing it into firm clamping engagement with the suspender web.

In operating the machine, the worker places the middle bar 11 upon the die 7 while the horn is in the position shown in Figure 5, the die being in uppermost position. It is necessary that the middle bar 11 be held in place while on the die 7 and for the purpose of so retaining it, a pair of keeper members 13 and 14, Figures 17, 19 and 20, are provided which fit in the longitudinal groove 6 at the ends of the die 7. The keeper members are each provided with a bore 15 housing a spring 17. The normal urge of the springs 17 force the members 13 and 14 above the level of the die 7 and holds them in contact with the ends of the middle bar 11 retaining it in place whilesoever the keeper members 13 and 14 are thus elevated. It will later be shown that the keeper members are positively depressed upon the operation of the final one of two successively actuated punches, and that when they reach their lower-most position they are latched in place so that when the final die is released the circular periphery of the horn 3 is unobstructed by any radially projecting structure. The keeper members have notches 18 at an intermediate level and lugs 19 adjacent the bottom. A latch 20 is provided comprising an enclosing member having an end portion 21 capable of engaging in the notch 18 of the keeper member 14 or engaging above the lug 19 of said keeper member. The latch 20 is also provided with inwardly extending lugs 22 which engage either the notch 18 of the keeper member 13 or the lug 19 of the said keeper member. The latch 20 is biased in a latching direction by a spring 23. When the keeper members are in elevated position the latch member engages the lugs 19 and limits the extent of protrusion of said keeper members. When the keeper members are depressed, the latch springs into the notches 18 and holds the keepers down until they are subsequently manually released by pressure upon the button 24.

Referring to Figures 5 and 6, it will be seen that a feeding carriage 25 is provided adjacent the horn 3. Said feeding carriage swings to right and left by means of parallel links 26 to which it is pivoted, and which links are in turn pivoted to a stationary part of the machine as is clearly shown in Figure 1. The carriage has side members 27 and 28. The side member 28 has a hinged portion 29 adjacent the end which approaches the horn 3.

Just at this point it will be helpful to describe the operation. The horn being in the position shown in Figure 5, the worker places a middle bar of a slide upon the die 7 and between the elevated keeper members 13 and 14. While the feeding carriage 25 is swung to the right, that is to say, in a direction away from the horn 3, the worker places a length of the suspender web in the carriage 25 between the side members thereof, said side members being spaced so as to cause the web to fit snugly within the carriage. The web is placed with its free end projecting slightly beyond the end of the carriage which is adjacent the horn 3. The carriage is then swung leftward, manually by the operator so that the projecting end of the web enters the trough 10 in the middle bar 11 which is positioned upon the horn. Just as the end of the web enters the trough 10, the cam projection 30 formed on the hinged portion 29 engages a bumper 31' fixed to the machine, which deflects the hinged portion 29 slightly inwardly, crimping the web, that is to say, narrowing its width so that the lateral edges of the web will be kept away from those parts of the slide which are to be mashed together in the pressing operations. It is important that the crimping does not take place until after the free end of the web has entered the trough 10, otherwise the free end will be wrinkled and may not enter the trough 10 perfectly.

A tension member 31 lies against the web while it is in the feeding carriage 25, which tension member was raised by the worker at the time she spaced the web in said carriage. The tension member is normally pressed against the web by means of a spring 32.

After the web has been inserted within the trough 10 of the middle bar 11 as above described, the foot treadle 4 is operated whereupon a punch 33 comes down upon the middle bar, cooperating with the die 7 to press the sides of the trough 10 together and to intimately clamp the free end of the web within the middle bar, through the intermediary of mechanism presently to be described. The punch 33 then raises from the work, the horn 3 makes a complete revolution in a counterclockwise direction as viewed from Figure 5, while at the same time the feeding carriage 25 is mechanically pushed to the rightward, that is to say, in a direction away from the horn 3. When the carriage 25 begins to be pushed to the right, the tension member 31 rides upon a fixed pin 34 so as to release the length of web lying in the carriage, which length of web winds around the horn in the course of its single revolution, so that when the horn comes up again to its original position, the webbing is looped around the horn with a layer of the web lying above the middle bar 11. The mechanism by which the horn is rotated upon the depression of the foot treadle, through a single rotation, and no more, will now be described.

A shaft 5 extends transversely through the upper part of the support 1 upon which shaft the power wheel 6 is freely mounted. Said shaft is provided with a gear 53 fixed thereto and having a groove 37 in which slides a key 38, said key being engageable in a corresponding groove 36 in the hub of the power wheel 6. A spring 36' normally urges said key into interlocking position with respect to the groove in the hub of the power wheel so that when in interlocked position, the power wheel imparts rotation to the shaft 5 and the gear 53. Said key is normally maintained in a position disengaged from the hub of the power wheel by means of a pivoted lever 41 which engages behind a projection 40 on the key. Said lever is normally biased to a position in the path of said projection by a spring 90 anchored on a fixed bracket 91. The lever 41 is controlled by a latch bar 92 connected by a rod 93 to the treadle. The latch bar 92 is formed with a recess 93 providing a shoulder 94 which engages over a ledge 95 suitably formed at the upper portion of a slot in the lever 41, through which slot the latch bar passes. The upper end of the latch bar is in the path of revolution of a radial extension 96 formed on the key.

When the treadle is pressed the latch bar 92 is drawn downwardly carrying with it the lever 41 through engagement of the shoulder 94 with the ledge 95. The downward movement of the latch bar is limited by the abutment of a shoulder 97 against a stop 98 which preferably forms part of the bracket 91. When the lever is depressed it moves from behind the projection 40 permitting the key 38 to move into engagement with the hub of the power wheel through the intermediary of the spring 36'. The power wheel immediately rotates the shaft 5, the gear 53, and the key itself, in a counterclockwise direction as indicated in Figure 10, until the extension 96 of the key strikes the latch bar 92 and moves it transversely in the slot of the lever 41, disengaging the shoulder 94 from the ledge 95 and permitting the lever 41 to spring up against the shaft 5.

The lever 41 has a cam-shaped end 99 as shown in Figure 11, and as the shaft 5 completes one revolution, and the key again comes into engagement with the lever, the projection 40 rides out upon the cam-shaped end of said lever withdrawing the key from engagement with the power wheel so that the shaft then ceases to revolve. This happens whether or not the foot of the operator is removed from the treadle, but it is necessary that the foot be removed from the treadle before another rotation of the parts is initiated so as to permit the latch bar 92 to move upwardly until the shoulder 94 again engages above the ledge 95 under the urge of a return spring 100.

In order to assure an absolutely definite position for the horn 3 and the die 7 when the parts come to standstill at the end of the revolution of the horn, the shaft 2 of which the horn forms a part, is provided with a collar 45 having an indentation 46 at a definite point corresponding to the up-right position of the die 7. A spring bolt 48 normally rests in the indentation 46. Said spring bolt is formed on a frame 49 having a roller 50 bearing against a cam 51 carried by a gear 52 which meshes with the gear 53. When the key 38 is engaged with the power wheel the gear 53 rotates, imparting rotation to the gear 52 and raising the bolt 48 from the indentation 46. Shortly after the beginning of the revolution of the horn, the cam 51 lets the bolt 48 down on the periphery of the collar 45 so that it is in readiness to fall into the indentation 46 immediately one exact revolution of the horn has been completed. The sprocket 39 is fixed to the power wheel and therefore rotates all the time, imparting continuous rotation to the sprocket 54 and the horn shaft 2.

The connection between the sprocket 39 and the horn shaft 2 is not a positive one, since the sprocket 54 which is in driving relation to the sprocket 39 by means of the chain 55 is only frictionally connected to the shaft 2 by means of friction clutch plates 56 and 57 pressed against said sprocket by a spring 58'. Normally when the bolt 48 is out of the indentation 46, the shaft 2 is driven through this friction clutch. But when the bolt 48 is in the indentation 46 a resistance to rotation on the part of the shaft 2 is created which overcomes the friction between the plates 56 and 57 and the sprocket so that there is slippage between the latter and no further rotation of the shaft 2 or horn 3 takes place within the cycle. The frictional connection between the sprocket 54 and the horn shaft 2 also permits the horn to be rotated at a much slower rate than that of said sprocket which is necessary in order to give time for the operator to allocate the parts of the slide upon the horn. The two to one relation of the sprockets also reduces the relative speed of revolution of the horn.

The punch 33 is operated through the shaft 5 by means of an eccentric 58 on the end of said shaft by means of which power is ensured for the pressing together of the sides of the trough 10 of the middle bar. The eccentric crank 59 connected to a sliding ram 60 to the lower end of which the punch 33 is indirectly attached through the intermediary of a laterally sliding block 61 the purpose of which will presently be described.

It is of course necessary that the punch 33 shall perform its pressing operation and rise sufficiently to release the work before the horn begins to rotate. This difference in timing is taken care of by the disposition of the axis of the cam 51 which is so disposed that it retards the withdrawal of the bolt 48 from the indentation 46 a sufficient period to permit the punch 33 to rise before the shaft 2 and the horn 3 begin to rotate.

Description of the operation of the machine has proceeded up to the point where the middle bar 11 of the slide has been clamped upon the free end of the web, and the horn 3 has revolved forming a loop of web about said horn and positioning a layer of the web above the middle bar. While the horn has been completing its single revolution the ram 60 has moved laterally carrying the punch 33 out of its operative path with regard to die 7, and bringing the second punch 63 into said operative path. The mechanism by means of which the sliding movement of said ram is accomplished comprises a bell crank 64 on a shaft 65 operating from the main drive by means of gears 52 and 53. A link 68 connects the said crank with the sliding block and the bell crank is actuated by a cam 66 formed on the interior of the gear 52 upon which rides a roller 67 mounted on a link 67' connected to said bell crank.

An indicator 82 secured to said bell crank and operating in connection with suitable indicia provided on a fixed part of the machine is convenient in telling the worker whether punch 33 or punch 63 is in operative position.

The ram 60 also operates a sliding support 69 which moves beneath a flattened face 70 of the horn 3 so as to support said horn when the pressure of the punches 33 or 63 is brought upon it. The sliding block is actuated by a bell crank 71 suitably connected to the ram by a link bolt 72 surrounded by a spring 73 by means of which spring the sliding block is restored to normal position beneath the horn.

By the time the punch 63 comes into the operative path with respect to the die 7, the horn has made its complete revolution, the wedge-shaped end of the lever 43 has severed the driving connection between the power wheel and the rest of the machine, and all things are at a standstill.

The worker then places the frame 74 in position beneath the punch 63 and resting upon the layer of web which overlies the middle bar 11. The correct position of the frame is determined by two upstanding lugs arranged on one of the keeper members and defining behind them a groove into which the end portion of the frame 74 is slipped. After the frame member has been allocated, the worker presses again on the foot treadle, whereupon the driving connection is made as heretofore, and the punch 63 comes down upon the frame member bending the upstanding lugs 77 of the middle bar down over the ends of said frame member. It will be observed from Figure 19 that the die is shaped to perform this function.

It will be recalled that when the free end of the web was first introduced into the trough of the middle bar a crimping action was performed upon the web to narrow it somewhat adjacent the points at which application of the die was to take place. Prior to the final pressing operation it is essential to draw the overlying layer of web away from the end edges of the frame members so as to keep it out of the way of the punch 63 and the upstanding lugs 77 when the latter are bent over said frame member. In order to accomplish this narrowing of the web a crimping device 78 is provided comprising two arms pivoted to a common point and supported on a fixed part of the machine, the free ends of said arms are formed with roughened faces or jaws which, when in engagement with the web, are capable of frictionally holding it. The two jaws are normally spaced above the surface of the web as it lies wound around the horns as is shown in Figures 5 and 13. The two arms pass through an opening 80 formed in the punch 63, see Figure 14. When the punch first descends the jaws on the ends of the two arms are brought into contact with the web. Then said jaws are brought toward one another through camming against the inclined edges 81 of said opening; and in this manner the webbing is crimped so as to bring its edges out of the path of action of the die and the parts of the slides immediately acted upon by said die.

The punch 63 has still another function. It will be noted from Figure 19 that the punch 63 is considerably wider than the cooperating die 7, so as to extend over the top surface of the keeper members 13 and 14. Consequently, when the punch 63 comes down in the performance of its pressing function it also depresses the keeper members so that when they reach their lowermost position the latch 20 snaps into the notches 18 and retains the keeper members with their tops flush with, that is to say, not extending beyond the periphery of the horn.

When the punch 63 is elevated and the horn has made its single complete revolution, the folded web with the completed slide may be drawn end-wise off from the horn. Prior to placing a new middle bar upon the die 7 for subsequent operation of the machine, it is necessary to press in the button 24 against the tension of the spring 23 so as to release the latch and permit the keeper members to snap up under the urge of their springs 17.

While I have in the above description disclosed a preferred and practical form of the invention, it is to be understood that the specific details as described are merely by way of example and not to be considered limitative in their bearing upon the scope of the invention as claimed. It is also to be understood that while I have described the machine as being adapted for the assembling of the slide on a suspender webbing, the invention is to be regarded as being of such breadth as to permit the machine to function in the assembling of any metallic fastening or attachment in connection with any form of webbing whatsoever.

What I claim as my invention is:

1. Machine for assembling a suspender web and slide parts comprising means for holding the middle bar of the slide, means for drawing the web in an endless path to form a closed loop surrounding said bar and overlapping in the region of said bar, and means for uniting said middle bar and the frame of a slide placed on the outside of the cooperating portions of said loop in juxta-position to said middle bar.

2. Machine for assembling a suspender web and slide parts, comprising means for holding the middle bar of the slide, revolving means for drawing the web in an endless path to form a closed loop surrounding said bar, and overlapping in the region of said bar and means cooperating with said revolving means for uniting said middle bar and the frame of a slide placed on the outside of the operating portions of said loop in juxta-position to said middle bar.

3. Machine for assembling a suspender web and slide parts, comprising means for holding the middle bar of a slide, said middle bar being of the type having a trough, means for introducing the end of a suspender web into said trough, means for pressing the sides of said trough together clampably upon said web, means for drawing said middle bar and said web in an endless path to form said web into a closed loop surrounding said bar and overlapping in the region of said bar, and a punch for uniting said middle bar and the frame of a slide placed on the outside of the operating portions of said loop in juxta-position to said middle bar.

4. Machine for assembling a suspender web and slide parts, comprising means for holding the middle bar of a slide, said bar being of the type having a trough, a swinging carriage for receiving a length of suspender web, said carriage being positioned with respect to said holding means to introduce the free end of the suspender web into said trough, means for pressing together the sides of said trough clampably against said suspender webbing, means for drawing said middle bar with said web in an endless path to form a closed loop surrounding said bar and overlapping in the region of said bar, and means for uniting said middle bar and the frame of a slide placed on the outside of the overlapping portions of said loop in juxta-position to said bar.

5. Machine for assembling a suspender web and slide parts comprising means for holding the middle bar of the slide, said bar being of the type having a trough, a carriage movable toward and away from said holding means for receiving a length of suspender web and introducing the free end of said web into said trough, means forming part of said carriage and actuable by engagement with coacting means on said machine for crimping said web adjacent its free end immediately before introduction of the latter in to said trough, a punch for pressing the sides of said trough together in clampable relation to said web, means for drawing said middle bar and web in an endless path to form a closed loop surrounding said bar and overlapping in the region of said bar, and a second punch for uniting said middle bar and the frame of a slide placed on the outside of the overlapping portions of said loop in juxta-position to said middle bar.

6. Machine for assembling a suspender web and slide parts comprising revoluble means for holding the middle bar of a slide, means for connecting a suspender web to said revoluble means, a source of power, means for connecting said revoluble means to said source of power, for effecting the revolution thereof, means for automatically limiting the movement of said revoluble means to one complete revolution for each actuation, for drawing the web in an endless path to form a closed loop surrounding said bar and overlapping in the region of said bar, and a punch operable upon a second actuation of said revoluble means for uniting said middle bar, and the frame of a slide placed on the outside of the overlapping portions of said loop in juxta-position to said middle bar.

7. Machine for assembling a suspender web and slide parts comprising a revoluble horn, a die carried by said horn, means for holding the middle bar of a slide on said die, means for connecting the end of a suspender web to said horn, a source of power, means for connecting said horn to said source of power for revolving said horn, means for limiting the movement of said horn to one complete revolution for each power connection, said horn upon first power connection drawing the web in an endless path to form a closed loop surrounding said bar and overlapping in the region of said bar, and a punch operable upon a second connection of said horn to said source of power for uniting the middle bar, and the frame of a slide placed on the outside portion of said loop in juxta-position to said bar.

8. Machine for assembling a suspender web and slide parts comprising a revoluble horn, a die carried by said horn, keeper means at the ends of said die, normally spring elevated above the level of said die for holding the middle bar of a slide, said slide being of the type having a trough, means for inserting the free end of a suspender web in said trough, a source of power, means for connecting said horn to said source of power for revolving said horn, means for limiting the movement of said horn to a single revolution each time it is connected to said source of power, a movable punch cooperating with the die carried by said horn for pressing together the sides of said trough, clampably against said suspender web, upon the first connection of said horn to the source of power, said horn in revolving drawing the web in an endless path to form a closed loop surrounding said bar and overlapping in the region of said bar, and a second movable punch operable upon a second connection of said horn to said source of power cooperating with the die carried by said horn for uniting said middle bar and the frame of a slide, placed on the outside of the overlapping portions of said loop in juxta-position to said middle bar, said second movable die engaging said keeper means to depress the same to a position flush with the surface of said horn to permit end-wise removal of the loop of said suspender web when said second die is elevated.

9. Machine for assembling a suspender web and slide parts as claimed in claim 8, including a latch for holding said keeper means in depressed condition, and means for releasing said latch.

10. Machine for assembling a suspender web and slide parts, comprising means for holding the middle bar of a slide, means for placing the web in an endless path to form a closed loop surrounding said bar and overlapping in the region of said bar, a punch for uniting said middle bar and the frame of a slide placed on the outside of the overlapping portions of said loop in juxta-position to said bar, and means for crimping the overlapping layer of said web to narrow the same for keeping it out of the way of said punch.

11. Machine for assembling a suspender web, and slide parts comprising means for holding the middle bar of the slide, revoluble means for drawing the web in an endless path to form a closed loop surrounding said bar and overlapping in the region of said bar, a punch cooperable with said revoluble means for uniting said middle bar and the frame of a slide placed on the outside of overlapping portions of said loop in juxta-position to said bar, and crimping means for narrowing the overlapping layer of said web to keep it out of the way of said punch, said crimping means being actuated by said punch.

12. Machine for assembling a suspender web and slide parts comprising means for holding the middle bar of a slide, said slide being of the type having a trough, means for introducing the free end of the suspender web into said trough, a first punch for pressing together the sides of said trough clampably against said webbing, means for drawing said middle bar with said web in an endless path to form a closed loop surrounding said bar and overlapping in the region of said bar, a second punch for uniting said middle bar, and the frame of a slide placed on the outside of the overlapping portions of said loop in juxta-position to said bar, and crimping means for narrowing the overlapping layer of said web to keep it out of the way of said second punch, said crimping means being actuated by said punch.

13. Machine for assembling a suspender web as claimed in claim 8, including laterally moving means for interchanging the positions of said movable punches.

14. Machine for assembling a suspender web and slide parts as claimed in claim 8, including laterally moving means for interchanging the positions of said movable punches, crimping means engaging the overlapping layer of web for narrowing the latter to keep it out of the way of said second movable punch, said second punch engaging said crimping means upon its descent and being shaped to bring said crimping means into crimping relation with respect to said web.

15. Machine for assembling a suspender web and slide parts as claimed in claim 8, including laterally moving means for interchanging the positions of said movable punches, and means movable with said laterally movable means into a position supporting said horn when either of said punches is in operative position.

16. Machine for assembling a suspender web as claimed in claim 8, including means for operating said punches, and a laterally moving ram engaging said punches, said ram having a two to one gear connection to said punch operating means whereby it makes one complete reciprocation during the two successive punching operations.

17. Machine for assembling a suspender web as claimed in claim 8, including means for operating said punches, said horn being frictionally connected to the punch operating means to permit asynchronous revolution of said horn with respect to the cycle of operation of said punch operating means.

18. Machine for assembling a suspender web as claimed in claim 8, including means for operating said punches, said horn being frictionally connected to the punch operating means to permit asynchronous revolution of said horn with respect to the cycle of operation of said punch operating means and means for determining a definite position for said horn at the end of one complete revolution thereof.

In testimony whereof we have affixed our signatures.

LYNDON W. JOYCE.
JOSEPH H. SANDERSON.